May 7, 1968
P. L. PENNARTZ
3,382,080
PROCESS FOR NEUTRALIZATION OF WERNER-TYPE
CHROMIUM COMPLEXES
Filed May 24, 1965
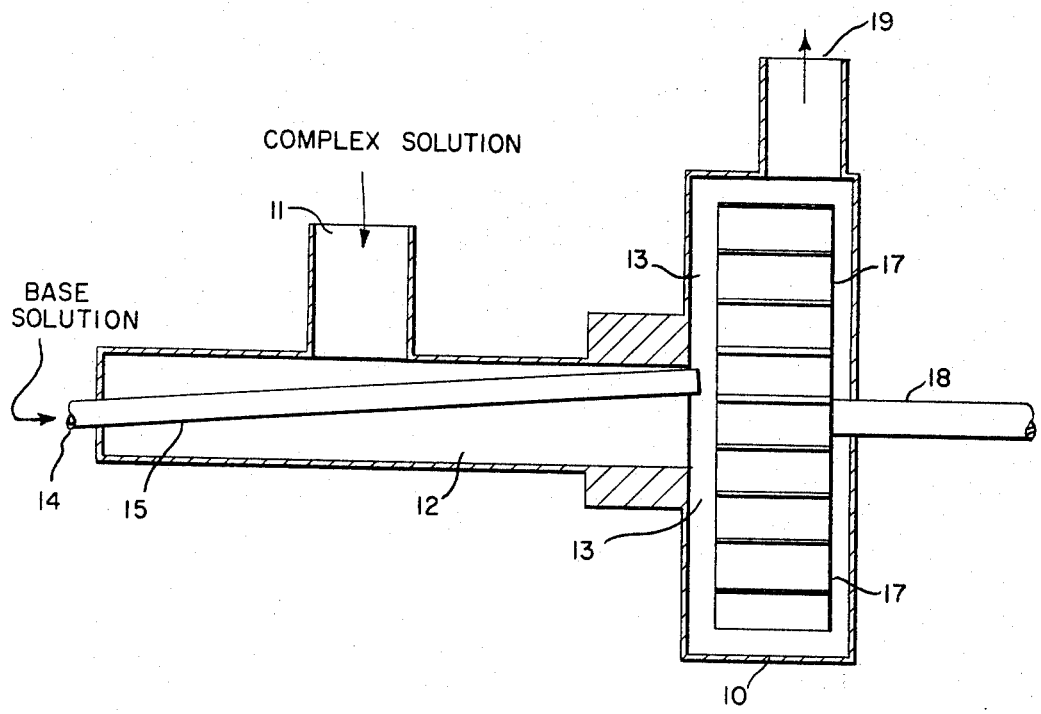
INVENTOR
PHILLIP L. PENNARTZ
BY Norbert F. Reinert
ATTORNEY

United States Patent Office 3,382,080
Patented May 7, 1968

3,382,080
PROCESS FOR NEUTRALIZATION OF WERNER-TYPE CHROMIUM COMPLEXES
Phillip L. Pennartz, Wilmington, Del., assignor to E. I. du Pont de Nemours and Company, Wilmington, Del., a corporation of Delaware
Filed May 24, 1965, Ser. No. 458,264
2 Claims. (Cl. 106—2)

ABSTRACT OF THE DISCLOSURE

Neutralization of Werner-type chromium complexes by high speed mixing of the Werner complex with an aqueous solution of a basic hydroxide to achieve a stable Werner complex having a level of neutralization of from 0.2 to 0.8 equivalent of hydroxyl iron per equivalent of chromium by maintaining a ratio of at least 40 parts of Werner complex to 1 part base solution at the point of mixing.

---

This invention relates to a new process for the neutralization of Werner complexes. More particularly, this invention relates to a new process for preparing neutralized solutions of Werner-type chromium complexes which consists of mixing a strong or weak base into a solution of the complex at the edge of a rapidly rotating impeller without destroying or precipitating the complex.

It is well recognized in the art that increasing the pH of a Werner-type chromium complex solution by addition of a base or basic buffer causes polymerization of the complex. This polymerization is desirable, since improved properties, such as improved water repellency, are obtained when a solution containing the polymerized complex is used to treat a substrate material. However, the addition of the base to the complex solution is well known to present a difficult operation. If too high a pH is obtained when neutralizing a solution of a complex the polymerization generally continues and the polymer precipitates out of solution. In the past it has been found that even if the overall pH of the solution is not too high, the pH at the point of interaction between the base and the complex exceeds the critical level causing local precipitation at that point so as to result in an extremely cloudy solution.

It has been found in accordance with the present invention that Werner-type chromium complex solutions can be neutralized to higher pH's than heretofore possible and are water clear and more stable than solutions neutralized by any previously known process. Furthermore, solutions neutralized by the process of the invention give water repellency and release properties better than those previously obtainable.

Typical of the complexes neutralized in accordance with the method of the invention are complexes in which a trivalent nuclear chromium atom is coordinated with a carboxylic acid group of an aliphatic monocarboxylic acid having a solubility in water of less than 0.1% by weight at 20° C. The aliphatic monocarboxylic acids can be straight or branched chain, saturated, fatty acids that are insoluble or very poorly soluble in water. Representative of such acids are capric, lauric, palmitic, hendecanoic, tridecanoic, neotridecanoic, myristic, margaric, arachic, and stearic.

The aliphatic monocarboxylic acids can also be halogenated acids of the formula $$R(CX_2)_nCOOH$$

where R is a member of the group consisting of hydrogen, trifluoromethyl and chlorodifluoromethyl, X is a halogen of the group consisting of fluorine and chlorine, $n$ is a positive interger of at least 4, with the proviso that (a) when R is trifluoromethyl, all the halogen atoms must be fluorine, (b) when R is chlorodifluoromethyl, at least 2/3 of the halogen atoms must be fluorine, (c) when R is hydrogen at least 1/2 of the halogen atoms must be fluorine and $n$ must be devisable by 2. Representative of such acids are perfluorooctanoic, perfluorohexanoic and heptacosafluoromyristic.

Briefly stated, the present invention consists of a method of adding a solution of a base, such as ammonium hydroxide or sodium hydroxide, to a solution of a complex wherein the complex solution and the base solution are brought together at an impeller enclosed in a chamber so that the revolving impeller forces a high rate of flow of solution through the chamber and discharges it therefrom immediately after mixing of the two solutions, thus preventing accumulation of the neutralized solution in the vicinity of the impeller. According to this process it is possible to achieve instantaneous and turbulent mixing of the complex and base solutions.

The amount of complex solution must be considerably in excess of the amount of base solution at the point of mixing in accordance with the method of the present invention in order to avoid over neutralization in the mixing device and to obtain the best stability and performance from the resulting neutralized composition. The ratio of complex solution to base solution passing through the mixing device per unit of time is preferably 40:1 or greater. In general, as this ratio is increased, improved neutralized complex solution stability is achieved. It is also preferred that the entire batch of complex solution be recycled through the mixing device used four or more times during the neutralization process.

In order to obtain the desired stability and performance of the neutralized complex solution, the level of neutralization attained in accordance with the method of present invention is controlled to be a value within a specified range. "Level of neutralization" herein means the number of equivalents of hydroxyl ion added per equivalent of chromium trivalent metal present in the complex solution being neutralized. The level of neutralization is preferably 0.2 to 0.8 OH−/Cr, and most preferably, 0.4 to 0.7 OH−/Cr. Below 0.2 or above 0.8−/Cr levels the performance rapidly decreases and the stability of the neutralized solution also rapidly decreases when the 0.8 OH−/Cr level is exceeded.

A better understanding of the invention will be gained from the following detailed description taken together with the accompanying patent drawing in which the process of the invention is carried out in a modified centrifugal pump.

Referring now to the drawing, a modified centrifugal pump 10 is provided with an opening 11 through which a Werner type complex solution is fed into a main inlet 12 in casing 13 of the pump. Base solution is fed through opening 14 of a small diameter tube 15 which extends slightly into casing 13 with its end near impeller 17 driven at high speed by impeller drive shaft 18 connected to a source of mechanical energy not shown. The end of tube 15 is off center as it enters casing 13 to avoid the region of relatively low turbulence at the center of impeller 17. The admixture is discharged from casing 13 from pump outlet 19.

The volume of complex solution passing through pump 10 is in the order of 40 times or more the volume of base solution passing through the pump. To accommodate this, it is convenient to have the respective cross-sectional areas of main inlet 12 and tube 15 proportional to the volume passing therethrough in order to assure a high velocity for each stream throughout the pump. For example, a suitable relationship would be an internal diameter of 1″ for main inlet 12 and an internal diameter of 1/8″ for tube 15.

It is preferred that mixing within pump 10 be as vigorous as possible and that the liquid be moved rapidly therethrough. This can be accomplished by running impeller 17 at a high speed and using a relatively small impeller in a relatively small casing. Generally, the impeller speed should be at least 1750 r.p.m. It would be preferable, however, to use a pump with a speed of 3500 r.p.m. and to use a smaller diameter impeller to move the same volume of liquid as the 1750 r.p.m. impeller with a larger impeller.

In place of employing the modified pump described above, it is also possible to mount a high speed propeller in a hollow cylinder inside a tank of the Werner complex solution and to feed the base solution through a tube in the side of the cylinder so that the base solution impinges on the rotating propeller. The rotating propeller thus would force the complex solution through the cylinder with high velocity. It is found, however, that this mixing scheme does not provide as much turbulence of the complex stream during neutralization as the mixing scheme using the modified pump previously described and accordingly is less desired for purposes of the invention.

The base used in the method of the invention can be ammonium hydroxide or an alkali metal hydroxide. The most preferred bases for use are ammonium hydroxide and sodium hydroxide. The concentration of this base solution is 0.005 to 1.0 normality with the most preferred concentration being 0.05 to 0.5 normality. Usually, the normality of the base solution should be approximately 0.05 times the concentration of the aqueous solution of the Werner complex. For example, if a 5% solution of chromium complex is used, a 0.25 normality base solution should be used.

The concentration of Werner-type chromium complex in the complex aqueous solution can vary over a wide range, but will generally fall within the range of from 0.1% to 20% by weight compex. Preferably the concentration of Werner-type chromium complex in the complex solution will be 1% to 10% by weight. The term "Werner-type chromium complex" herein means the chromium complex in the form it is usually available as a commodity of commerce. This latter form comprises the complex of chromium with the carboxylic acid (e.g. stearic acid) present in the solvent system in which it is prepared so that the final commodity contains about 15 to 30% by weight of the complex itself, about 5–50% by weight water and about 20–80% by weight a lower alcohol, i.e., an alcohol containing from 1 to 4 carbon atoms.

A further understanding of the invention will be gained from the following working examples in which all percentages are precent by weight unless otherwise indicated.

Example 1

An aqueous solution of a chromium complex of a fatty acid is neutralized with a dilute, aqueous solution of ammonium hydroxide using a mixing device of the type shown in the patent drawing. A solution containing 84 parts of water and five parts of "Quilon"® C chrome complex, produced by E. I. du Pont de Nemours & Company, Inc., is fed into the mixing device through opening 11. Eleven parts of a 0.25 normal solution of ammonium hydroxide in water is fed into the mixing device through opening 14. The ammonium hydroxide solution is fed at a slow enough rate that the ratio of the chromium complex solution passing through the mixing device to the ammonium hydroxide solution feed rate is greater than 40 to 1. This requires recirculating the chromium complex solution through the mixing device at least four times during the neutralization. Using this process a chromium complex solution neutralized to a 0.5 OH$^-$/Cr mole ratio is obtained. The solution is clear and exhibits exceptional stability when stored at room temperature and at 115° F.

Unbleached kraft paper is treated with the solution by immersion and wringing to remove excess solution. One sample of the treated paper is dried against a hot drum dryer at 240° F. for 90 seconds, while a second sample is air dried at 72° F. and 50% relative humidity. Both samples exhibit excellent water repellency.

Example 2

An aqueous solution of the chromium complex of stearic acid is neutralized with a dilute solution of ammonium hydroxide in a mixing device of the type shown in the patent drawing. A solution containing 81.2 parts of water and 10 parts of "Quilon"® S chrome complex, produced by E. I. du Pont de Nemours & Company, Inc., is fed into opening 11 of the mixing device and 8.8 parts of 0.5 normal ammonium hydroxide in water is fed into opening 14. The dilute, aqueous ammonium hydroxide solution is introduced at a slow enough rate that the ratio of the chromium complex solution passing through the mixing device to the ammonium hydroxide solution feed rate is greater than 40 to 1. This requires recirculating the chromium complex solution through the mixing device at least four times during the neutralization. The resulting complex solution contains 10% of the chromium complex commodity and is neutralized to a 0.4 OH$^-$/Cr mole ratio. The solution is clear and stable.

The neutralized chromium complex solution is applied to unbleached kraft paperboard using a transfer roll. The treated board is immediately dried in an air circulation oven for five minutes at 250° F. The treated board exhibits excellent water repellency.

Example 3

An aqueous solution of a chromium complex of a fatty acid is neutralized with a dilute aqueous solution of sodium hydroxide in a mixing device of the type shown in the patent drawing. A solution containing 89.2 parts of water and two parts of "Quilon®" C chrome complex, produced by E. I. du Pont de Nemours & Company, Inc., is introduced through opening 11 and 8.8 parts of a 0.1 normal solution of sodium hydroxide in water is introduced through opening 14 at a slow enough rate that the ratio of the feed rate of the chromium complex solution to the sodium hydroxide solution feed rate will be greater than 50 to 1. This requires recirculating the chromium complex solution through the mixing device at least five times during the neutralization. The resulting solution contains 2% chromium complex and the solution is neutralized to a 0.4 OH$^-$/Cr mole ratio. The solution is clear and exhibits excellent stability.

When the neutralized solution is used to treat unbleached kraft paper following the procedure of Example 1, excellent water repellency is achieved on both the drum dried and the air dried samples.

Example 4

An aqueous solution of a chromium complex of a perfluorinated acid is neutralized with a dilute, aqueous solution of ammonium hydroxide using a mixing device of the type shown in the patent drawing. A solution containing 86.2 parts of water and 5 parts of "Scotchban®," a chromium complex of a perfluorinated acid produced by Minnesota Mining and Manufacturing Company, is fed into the mixing device through opening 11 and 8.8 parts of a 0.25 normal solution of ammonium hydroxide in water is fed into the mixing device through opening 14. The ammonium hydroxide solution is fed at a slow enough rate that the ratio of the chromium complex solution passing through the mixing device to the ammonium hydroxide solution feed rate is greater than 40:1. This requires recirculating the chromium complex solution through the mixing device at least four times during the neutralization. Using this process a chromium solution neutralized to the 0.4 OH$^-$/Cr mole ratio is obtained. The solution is clear and exhibits exceptional stability when stored at room temperature and at 115° F.

The neutralized solution is used to treat unbleached kraft paper and bleached cotton cloth by immersing, wringing, and drum drying at 240° F. for two minutes.

The treated paper and cloth samples exhibit excellent oil and water repellency.

Since many different embodiments of the invention may be made without departing from the spirit and scope thereof, it is to be understood that the invention is not limited by the specific illustrations except to the extent defined in the following claims.

I claim:
1. A method for neutralizing a Werner type chromium complex solution comprising bringing together at an impeller operated at a speed in excess of 1750 r.p.m. to provide instantaneous and turbulent mixing within an enclosed chamber:
   (a) a solution containing 0.1 to 20% by weight of a chrome complex consisting of a solution of a trivalent nuclear chromium atom in coordination with an aliphatic monocarboxylic acid having a solubility in water of less than 0.1%.
   (b) a 0.05 to 0.5 normal aqueous solution of a base selected from the group consisting of ammonium hydroxide and alkali metal hydroxides; wherein the ratio of solution (a) to solution (b) is at least 40:1 and carrying out mixing in said manner by said impeller until reaching a level of neutralization within the range of 0.2 to 0.8 equivalent of hydroxyl ion per equivalent of chromium and immediately discharging said neutralized mixture from the chamber.

2. The method of claim 1 wherein the aliphatic monocarboxylic acid in coordination with a trivalent nuclear chromium atom is a member of the group consisting of capric, aluric, palmitic, hendecanoic, tridecanoic, neotridecanoic, myristic, margaric, arachic, stearic, perfluorooctanoic, perfluorohexanoic and heptafluoromyristic acid.

References Cited

UNITED STATES PATENTS

| | | | |
|---|---|---|---|
| 2,662,835 | 12/1953 | Reid | 106—287 X |
| 2,904,571 | 9/1959 | La Fleur | 260—438 |
| 3,185,717 | 5/1965 | Trebilcock | 260—438 |
| 3,284,215 | 11/1966 | Bartz | 106—2 X |

ALEXANDER H. BRODMERKEL, *Primary Examiner.*

L. B. HAYES, *Assistant Examiner.*